United States Patent [19]

Macdonald

[11] 4,173,322
[45] Nov. 6, 1979

[54] FLUTTER PREVENTION MEANS FOR AIRCRAFT PRIMARY FLIGHT CONTROL SURFACES

[75] Inventor: Kenneth A. B. Macdonald, Maple Valley, Wash.

[73] Assignee: The United States of America as represented by the Secretary of the Air Force, Washington, D.C.

[21] Appl. No.: 900,621

[22] Filed: Apr. 27, 1978

[51] Int. Cl.² ............................................. B64C 13/00
[52] U.S. Cl. ................................. 244/75 A; 244/83 A
[58] Field of Search ............... 244/83 A, 75 R, 75 A, 244/78, 90 R, 213, 215

[56] References Cited

U.S. PATENT DOCUMENTS

| 1,747,344 | 2/1930 | Bell | 244/83 A |
| 2,246,203 | 6/1941 | Florez | 244/83 A |
| 2,835,459 | 5/1958 | Stewart | 244/83 A |

FOREIGN PATENT DOCUMENTS

| 403223 | 4/1943 | Italy | 244/83 A |

*Primary Examiner*—Galen L. Barefoot
*Attorney, Agent, or Firm*—Joseph E. Rusz; James S. Shannon; Casimer K. Salys

[57] ABSTRACT

An apparatus attached to the flight control surface designed to lock the surface in a fixed and generally neutral position when a hydraulic pressure failure occurs. A spring loaded hydraulic actuator is mounted in the fixed wing structure but has an arm with a locking roller extending into a wedge shaped recess in the adjacent movable control surface. When hydraulic pressure is present the actuator spring is compressed and the locking roller on the actuator arm is moved to the wide end of the wedge, effectively avoiding any contact between the roller and the flight control surface surrounding it irrespective of the control surface orientation. Upon the occurrence of a hydraulic pressure drop, the compressed spring translates the actuator arm drawing the locking roller into a detent in the narrow end of the wedge, thereby inhibiting control surface rotation and flutter.

2 Claims, 3 Drawing Figures

FLUTTER PREVENTION MEANS FOR AIRCRAFT PRIMARY FLIGHT CONTROL SURFACES

RIGHTS OF THE GOVERNMENT

The invention described herein may be manufactured and used by or for the Government of the United States for all governmental purposes without the payment of any royalty.

BACKGROUND OF THE INVENTION (1) Field of the Invention

This invention relates to aircraft control surfaces and more particularly to a means of inhibiting uncontrolled flutter of a control surface when a hydraulic pressure failure occurs.

(2) Description of the Prior Art

Most modern jet transport aircraft assure adequate communication between the pilot and the control surfaces to overcome problems such as control surface jams or component failures. This is conventionally accomplished by redundancies in the control system. Unfortunately, flutter prevention demands an even higher standard with respect to each of the individual control surfaces. To overcome the potential danger of flutter the surfaces must be able to cope with failures in combination, such as the concurrent loss of two hydraulic systems, the loss of one hydraulic system plus a structural disconnect at the remaining operable actuator, and in remote cases, the structural disconnect of more than one actuator, assuming the control surface has only two actuators and one is a redundant unit.

A variety of techniques have been utilized to satisfy the higher standard of reliability associated with flutter prevention in control surfaces such as ailerons, rudders and elevators. Typical approaches include the use of nose weights for balance, multiple redundancy of hydraulic supplies or actuators, and the use of actuators with dampers incorporated in their structure. Though such devices add to the weight and life cycle cost of the aircraft, the superior position of the flight controls in the flight safety hierachy has historically prescribed the use of such apparatus to overcome the problem of control surface flutter.

SUMMARY OF THE INVENTION

A spring loaded hydraulic actuator is mounted in the fixed structure of the aircraft adjacent the movable control surface. An arm of the actuator carries a locking roller which together with the arm extends into a recess in the control surface. The recess area within which the locking roller acts is in the shape of a wedge having one sharply converging end, configured such that the locking roller does not interfere with control surface rotation when it is positioned in the wide segment of the wedge but locks the control surface in a fixed orientation when drawn into a detent in the narrow portion of the wedge. When hydraulic pressure is present the actuator spring is compressed and the locking roller on the actuator arm sits in the wide section of the wedge to permit unobstructed movement of the control surfaces by the control actuators. When the hydraulic system loses pressure the spring force draws the locking roller into the detent at narrow end of the wedge to inhibit flutter type movement of the control surface. Upon the restoration of hydraulic pressure the locking roller is withdrawn from the detent by the positive action of the hydraulic actuator, restoring control surface movement and regulation.

DESCRIPTION OF THE PREFERRED EMBODIMENT

Figure 1:
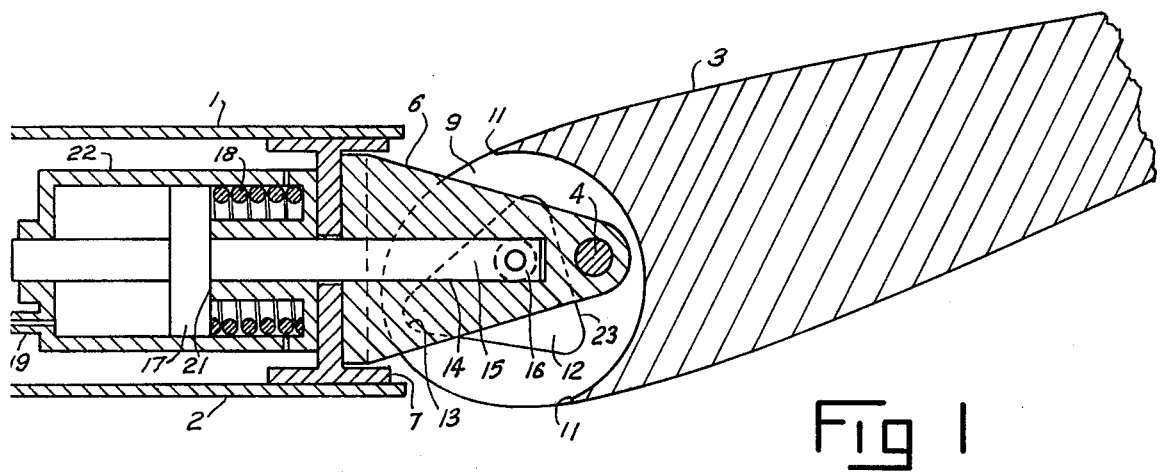
FIG. 1 is a cross-sectional view of the wing and control surfaces with one embodiment of the invention, shown in the orientation depicting a pressurized hydraulic system.
Figure 2:
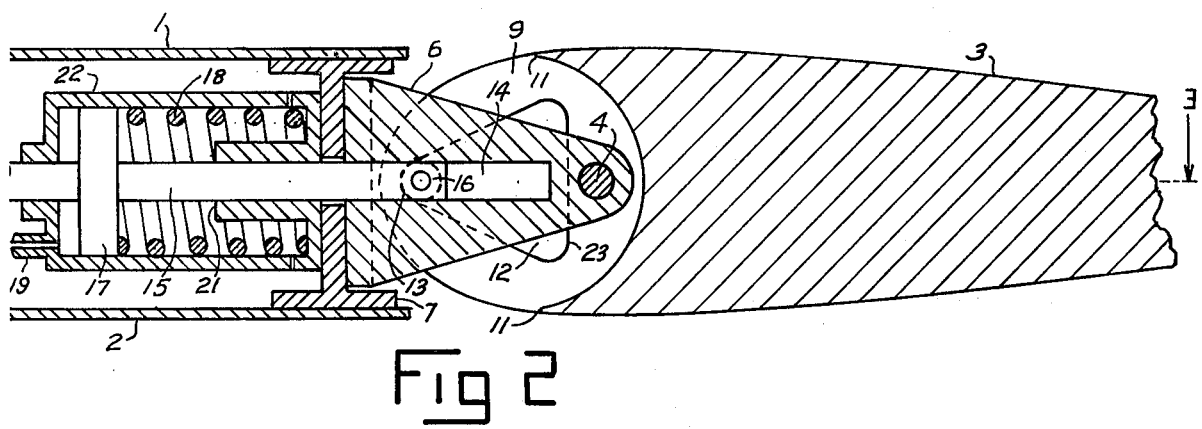
FIG. 2 is the cross-sectional view of FIG. 1 but depicted with a hydraulic system failure.
Figure 3:
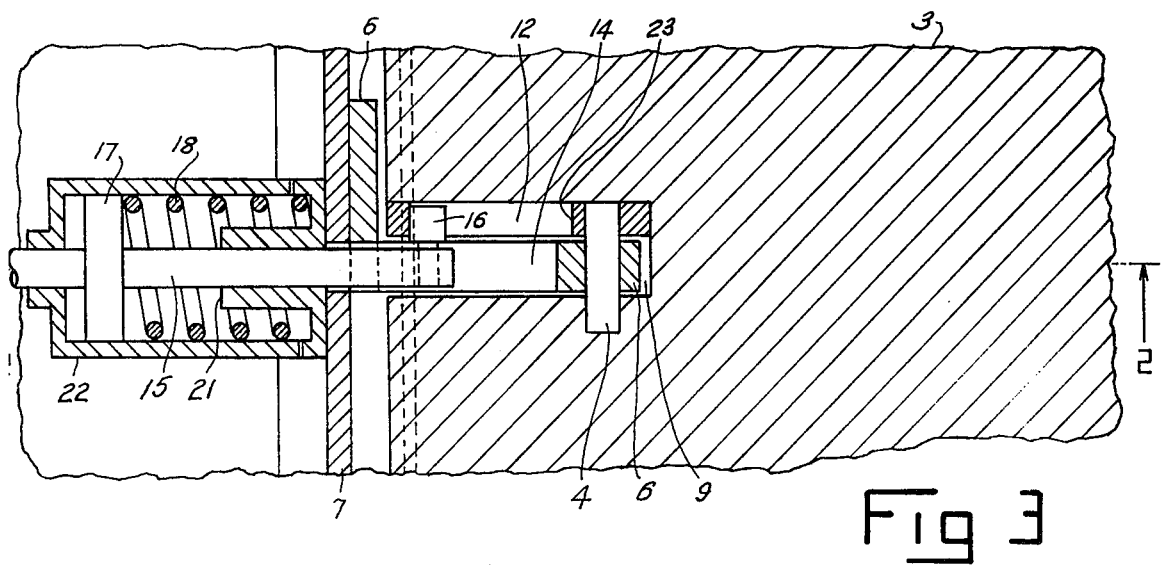
FIG. 3 shows the orientation, depicted in FIG. 2 but sectioned in a plane perpendicular thereto.

FIGS. 1, 2 and 3 show one embodiment of the invention in diverse cross-sectional views. The apparatus as appears in the first figure is mounted within the trailing edge of a wing, having an upper wing surface 1 and a lower wing surface 2. Aileron type control surface 3 pivots about control surface hinge pin 4. The pin is mounted in static hinge bracket 6 which is affixed to the trailing structural beam 7 of the wing. Attachment of bracket 6 to structural beam 7 may be by rivets or other suitable means, all of which are conventional and not specifically shown in the drawings. Likewise, the hydraulic control actuators used to rotate control surface 3 about hinge pin 4 are also not shown in the drawings, being that their structures and attachments are conventional and not directly relevant to this embodiment.

The forward edge 9 of control surface 3 is recessed in the area of static hinge bracket 6 to allow adequate rotation of control surface 3 about hinge pin 4 without interference between forward edges 11 and static hinge bracket 6. Control surface 3 also contains a wedge shaped locking recess 12 having detent 13 at the sharply converging forward end of the wedge shape.

Static hinge bracket 6 has a slot 14 to permit piston arm 15 and locking roller 16 attached thereto to travel back and forth in response to forces acting on piston 17. Actuator piston 17 responds in conventional fashion, moving to the right and compresses spring 18 when the hydraulic lines are pressurized or to the left when hydraulic pressure drops below that necessary to compress spring 18.

FIGS. 1, 2 and 3 also depict the two operating states of the invention embodiment. During normal operation pressurized hydraulic fluid enters the actuator through inlet port 19 driving piston 17, piston arm 15 and locking roller 16 into the wide region of recess 12. This orientation appears in FIG. 1, where control surface 3 is shown rotated counterclockwise by approximately 20 degrees. This state permits control surface 3 to rotate unrestricted, effectively decoupling the control surface from the locking mechanism.

Upon the occurrence of a hydraulic pressure failure, piston 17, which previously rested against stop 21 formed from an extension of actuator body 22, is now driven leftward by compressed spring 18 to the resting position appearing in FIG. 2. Piston arm 15 and locking roller 16 also travel leftward, eventually reaching a location where locking roller 16 enters detent 13 formed by rim 23 of wedge shaped locking recess 12.

If control surface 3 is aligned with wing surfaces 1 and 2, locking roller 16 is simply drawn into detent 13 by the leftward travel of the actuator. On the other hand if control surface 3 is not aligned with the wing surfaces when the hydraulic pressure drops, locking roller 16 makes earlier contact with rim 23 of locking recess 12. The force from spring 18 acting through locking roller 16 onto rim 23 produces a torque on control surface 3 tending to rotate the control surface into alignment with wing surfaces 1 and 2 while drawing locking roller 16 toward detent 13. Thereby, control surface 3 is driven into alignment as locking roller 16 moves into the position of detent 13.

Once locking roller 16 is positioned in detent 13 flutter and other movements of wing surface 3 are significantly inhibited.

FIG. 3 shows the apparatus cross-sectioned through a plane parallel to that of the wing surfaces 1 and 2 at the location designated in FIG. 2. Locking roller 16 appears in the position defined by detent 13.

The use of the mechanism described above to inhibit control surface flutter is superior to other techniques, specifically avoiding the need for control surface balance weights or redundancy in actuators and dampers. Note that the structure depicted and described produces a uniquely rigid locking arrangement in which the moment arm of locking roller 16 about control surface hinge pin 4 increases as locking roller 16 translates in the direction of detent 13. In addition, the mechanism self-centers the control surfaces upon the occurrence of a hydraulic pressure failure without the need for external power or means. The structural simplicity of this apparatus eases its incorporation into diverse locations and thereby facilitates design standardization.

Those skilled in the art will recognize that refinements in structure, such as the wedge shaping and locking roller configuration, are readily feasible but continue to fall within the scope and spirit of the claimed invention.

I claim:

1. A flight control surface rotation and flutter prevention apparatus, comprising:

(a) a flight control surface, rotatably mounted to a wing about a hinge axis substantially perpendicular to the chord of said wing, said surface having a wedge shaped recess medial of said wing and said hinge axis which has rims that converge sharply to a detent in the direction away from said hinge axis;

(b) a spring return hydraulic actuator fixedly mounted in said wing in confronting relationship to said wedge shaped recess, said actuator having a first operating state in which hydraulic pressures forces said actuator to its extreme of travel and compresses a return spring, and a second operating state in which hydraulic pressure is absent and said return spring forces said actuator to its opposite extreme of travel;

(c) a translating arm, capable of translation in a direction substantially parallel to the wing chord, connected at its first end to said actuator and extending at its second end into said control surface in the region of said recess; and (d) a means for making contact between said second end of said translating arm and the rims of said wedge shaped recess, said means attached to said second end of the translating arm so that said means is drawn into the detent of the recess when hydraulic pressure is absent, and driven into the wide end of the wedge when hydraulic pressure is present, respectively inhibiting and enabling rotation of the flight control surface about its hinge axis.

2. The apparatus recited in claim 1, wherein the means for making contact between the end of the translating arm and the rims of the wedge shaped recess is a locking roller rotatably mounted on the translating arm and making contact with the rim of the wedge shaped recess.

* * * * *